United States Patent [19]

Hanya et al.

[11] Patent Number: 6,043,956
[45] Date of Patent: Mar. 28, 2000

[54] SUSPENSION FOR DISK DRIVE

[75] Inventors: Masao Hanya; Tetsuya Fujiwara; Hiroshi Ozawa, all of Yokohama; Akihiro Takei, Kanagawa-ken; Osamu Iriuchijima, Yokohama, all of Japan

[73] Assignee: NHK Spring Co., Ltd., Yokohama, Japan

[21] Appl. No.: 09/153,530

[22] Filed: Sep. 15, 1998

[30] Foreign Application Priority Data

Sep. 19, 1997 [JP] Japan ................................ 9-255278

[51] Int. Cl.$^7$ ........................................................ G11B 5/60
[52] U.S. Cl. ............................................................ 360/104
[58] Field of Search .............................................. 360/104

[56] References Cited

U.S. PATENT DOCUMENTS

| | | | |
|---|---|---|---|
| 5,812,342 | 9/1998 | Khan et al. | 360/104 |
| 5,844,752 | 12/1998 | Bozorgi et al. | 360/104 |
| 5,966,269 | 10/1999 | Marek et al. | 360/104 |

FOREIGN PATENT DOCUMENTS

5-282642  10/1993  Japan .

Primary Examiner—Robert S. Tupper
Attorney, Agent, or Firm—Frishauf, Holtz, Goodman, Langer & Chick, P.C.

[57] ABSTRACT

A suspension for disk drive, comprising a load beam having a proximal end portion fitted with a base plate, a distal end portion fitted with a flexure, and bent edges formed individually on the opposite sides thereof, the load beam being gradually tapered from the proximal end portion toward the distal end portion, a support projection interposed between the load beam and the flexure, and a flexible portion of the load beam defined in a region between the support projection and the base plate. Openings are formed in an inner portion of a second region between the center of gravity of the flexible portion and the base plate, inside the bent edges, so that $K_{Lb}/K_{SP}$ is 2 or more, where $K_{Lb}$ is a spring constant for a first region between the center of gravity of the flexible portion and the support projection and $K_{SP}$ is a spring constant for the second region, the area of the openings accounting for 25% or more of the area of the inner portion.

4 Claims, 8 Drawing Sheets

SUSPENSION FOR DISK DRIVE

BACKGROUND OF THE INVENTION

The present invention relates to a suspension for supporting a head section of a disk drive stored in an information processing apparatus such as a personal or portable computer.

Figure 8:
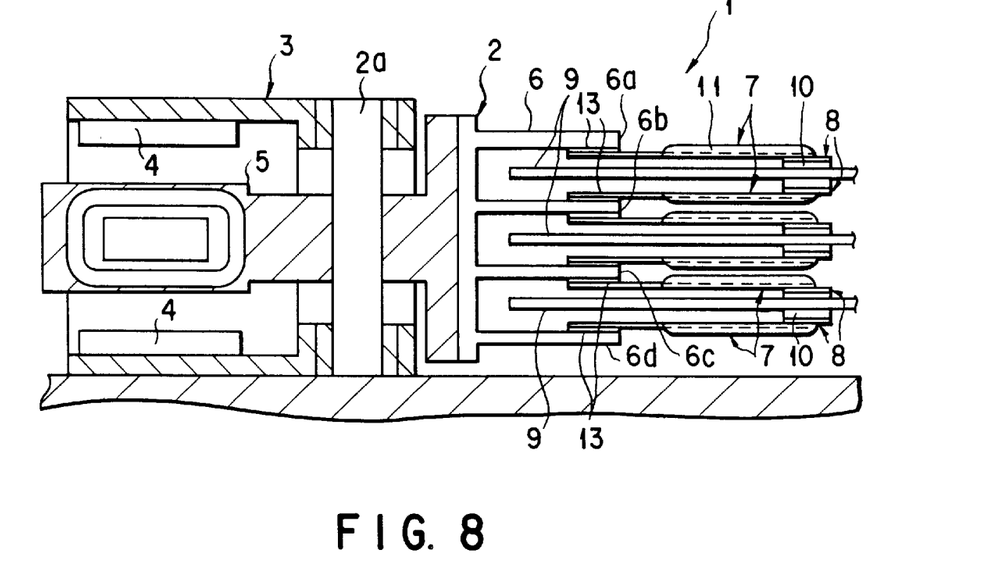
FIG. 8 is a side view, partially in section, showing a hard disk drive.

FIG. 8 shows a part of a hard disk drive (HDD) 1. A carriage 2 of the HDD 1 is turned around a shaft 2a by means of a motor 3 for positioning, such as a voice-coil motor. The carriage 2 is composed of a coil portion 5 located near magnets 4 of the motor 3, arms (actuator arms) 6 fixed to the coil portion 5, suspensions 7 situated on the distal end of the arms 6, heads 8 attached individually to the respective distal end portions of the suspensions 7, etc. Each head 8 can be moved to a desired track (recording surface) of a hard disk 9 by driving the carriage 2 in the aforesaid direction by means of the motor 3.

Each head 8 is provided with a slider 10, which is located in a position such that it can be opposed to the tracks of the disk 9, a transducer (not shown) held by the slider 10, etc. When the slider 10 is slightly lifted above the surface of the disk 9 as the disk 9 rotates at high speed, an air bearing is formed between the disk 9 and the slider 10.

Figure 9:
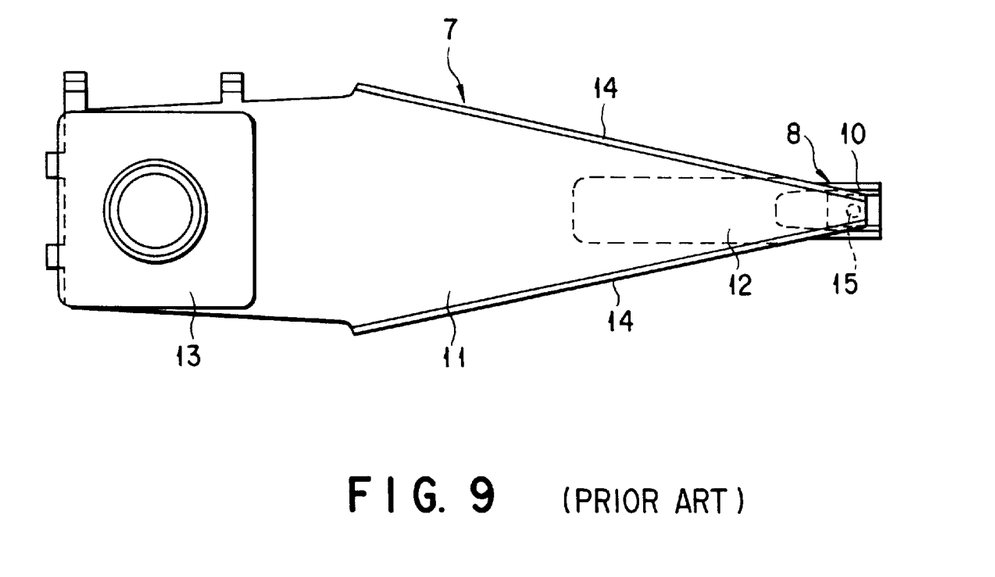
FIG. 9 is a plan view of a conventional suspension.
Figure 10:
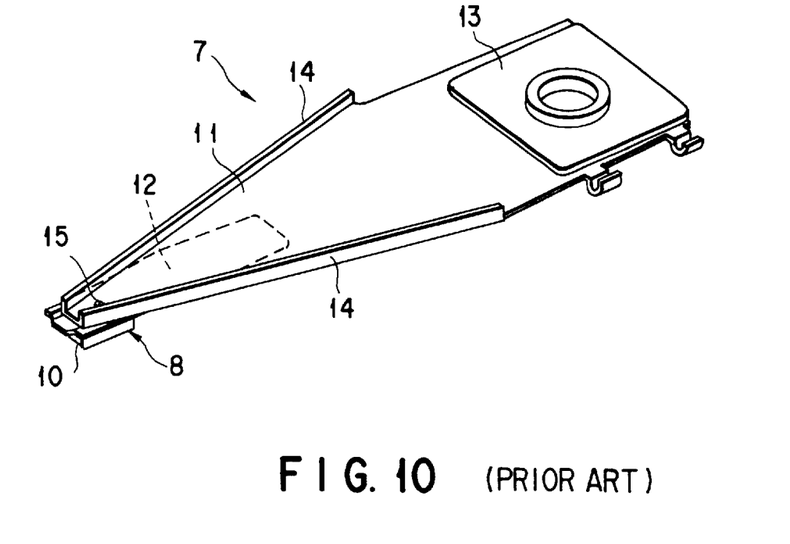
FIG. 10 is a perspective view of the conventional suspension shown in FIG. 9.

FIGS. 9 and 10 show a prior art example of the suspension 7. This suspension 7 has a standard shape called Type 8 in the art. The suspension 7 includes a load beam 11 formed of a thin precision plate spring, a flexure 12 formed of a very thin plate spring fixed to the distal end portion of the beam 11 by laser welding or the like, a base plate 13 fixed to the proximal end portion of the beam 11, etc. The slider 10 is supported by the flexure 12. The load beam 11 has a shape similar to an isosceles triangle, tapered from its proximal end portion toward its distal end portion. A bent edge 14 is formed on each of two opposite oblique side portions of the beam 11.

Figure 11:
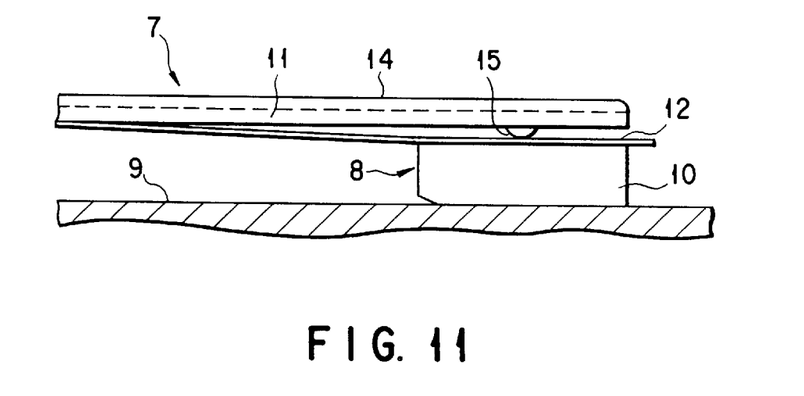
FIG. 11 is a side view schematically showing a head section of the suspension of FIG. 9.

A hemispherical support projection 15 protrudes from the distal end portion of the load beam 11 toward the flexure 12. As shown in FIG. 11, the distal end of the projection 15 abuts against the flexure 12. Accordingly, the head 8 can make three-dimensional displacements, such as pitching and rolling, around the projection 15. The projection 15 is also called a dimple in the art. The projection 15 may be provided on the flexure 12 in place of the load beam 11.

As modern information processing apparatuses, such as personal computers, are reduced in size, the shock resistance of the HDD becomes a more important factor for the following reasons. In the case of a personal computer that uses a small-sized HDD (2.5-inch HDD), such as a so-called notebook computer, the shock-absorbing capability of its casing is not good enough. In the case of a desktop computer (using a 3.5-inch HDD), on the other hand, the HDD may possibly be subjected to a relatively heavy shock if it is handled wrongly in assembling operation.

Figure 12:
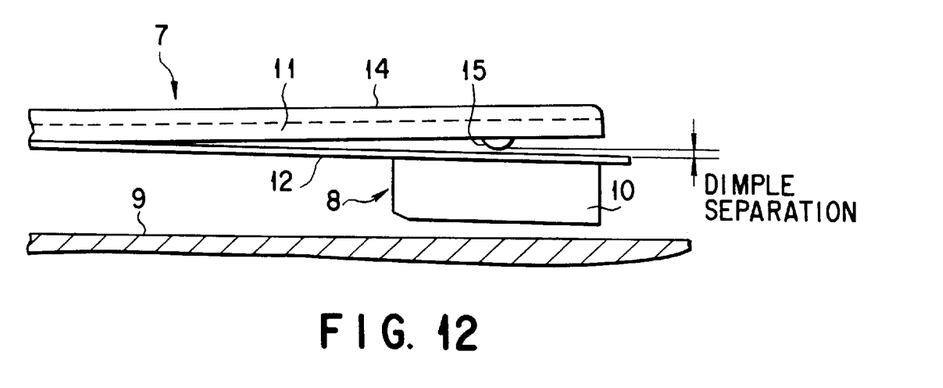
FIG. 12 is a side view schematically showing a state in which a shock is applied to the suspension of FIG. 9.

When the aforementioned conventional suspension 7 was subjected to a shock exceeding its tolerance limit, the head 8 fluttered, and the head 8 and the disk 9 were damaged. The inventors hereof observed the movement of the shocked head 8 by using a high-speed camera and the like, and found that the head 8 and the disk 9 were damaged in the following manner. When the head 8 was shocked, the distal end of the load beam 11 sprang up, as shown in FIG. 12. Thereupon, the head 8 underwent pitching or rolling so that its corner portions ran against the surface of the disk 9. A phenomenon called dimple separation such that the flexure 12 and the support projection 15 separates from each other, in particular, is a main cause of the head's fluttering.

Figure 13:
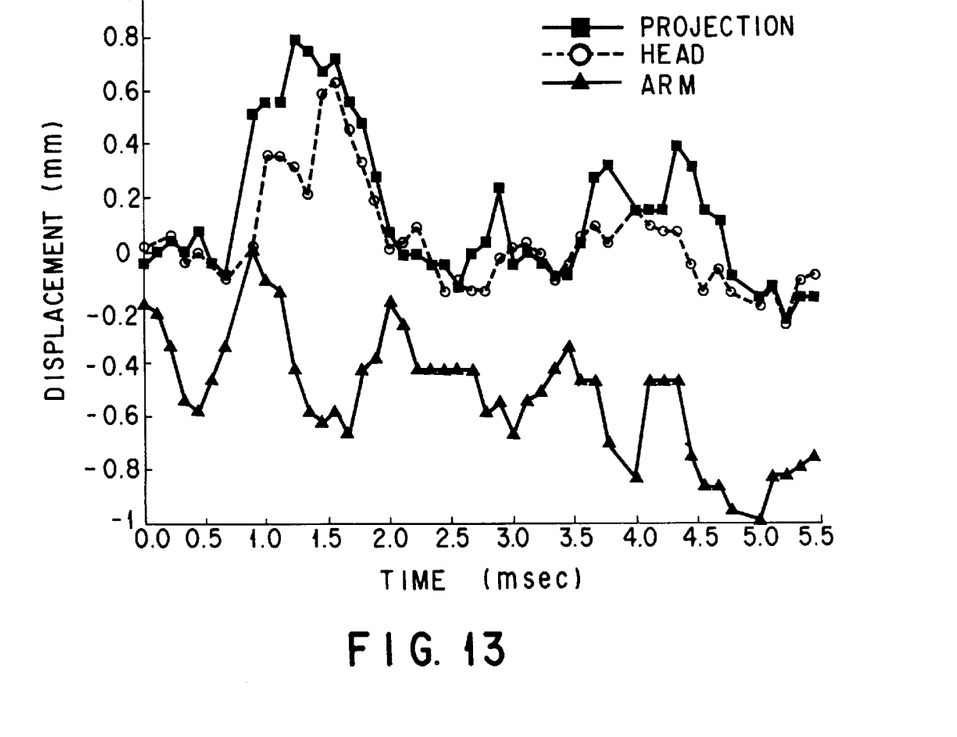
FIG. 13 is a diagram showing displacements of a head and the like in a shock test on the suspension of FIG. 9.
Figure 14:
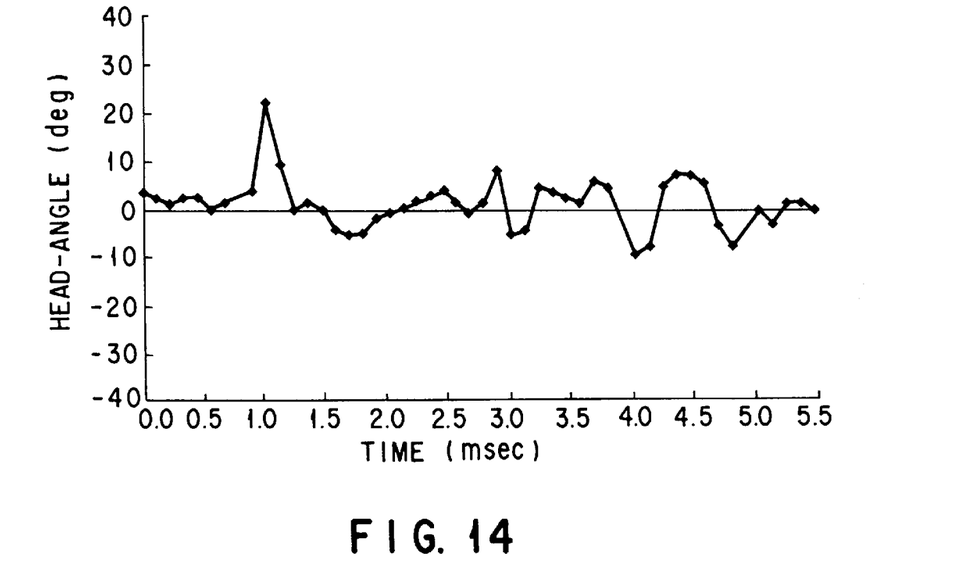
FIG. 14 is a diagram showing change of the head angle in the shock test on the suspension of FIG. 9.

FIGS. 13 and 14 show results of a shock test on the conventional suspension 7. Test conditions include a duration time of 0.96 msec, acceleration (G's) of 452 G, and contact pressure (G/L) of 3.5 gf between the projection 15 and the flexure 12. As shown in FIG. 13, the respective displacements and moving speeds of the head 8 and the projection 15 increase remarkably at points near 1.0 msec on the axis of abscissa, and there is a time lag between the displacements of the members 8 and 15. This shows the occurrence of dimple separation. As shown in FIG. 14, moreover, the head angle changes drastically at points near 1.0 msec on the axis of abscissa.

BRIEF SUMMARY OF THE INVENTION

Accordingly, the object of the present invention is to provide a suspension for disk drive, in which a head cannot be easily caused to flutter when it is shocked, thus ensuring satisfactory shock resistance.

Figure 1A:
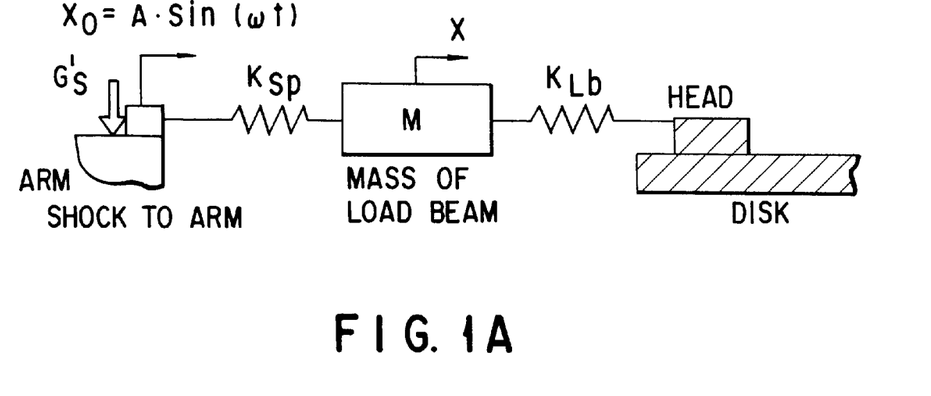
FIGS. 1A, 1B and 1C are diagrams illustrating mechanical models of a shock applied to a suspension.
Figure 1B:
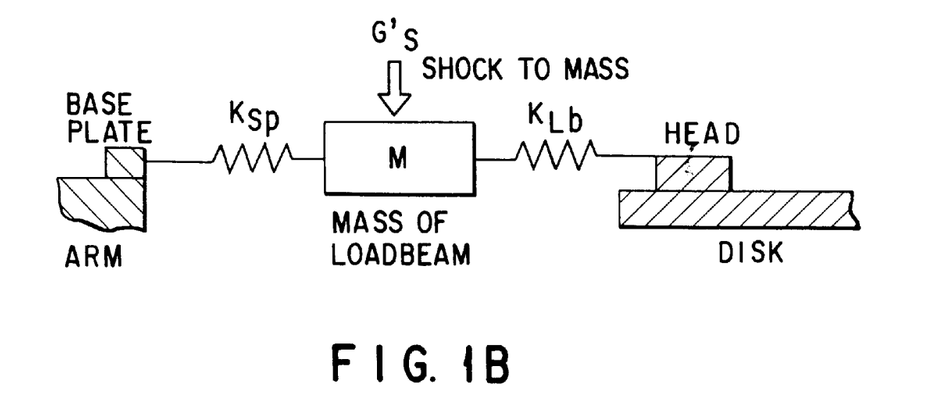
Figure 1C:
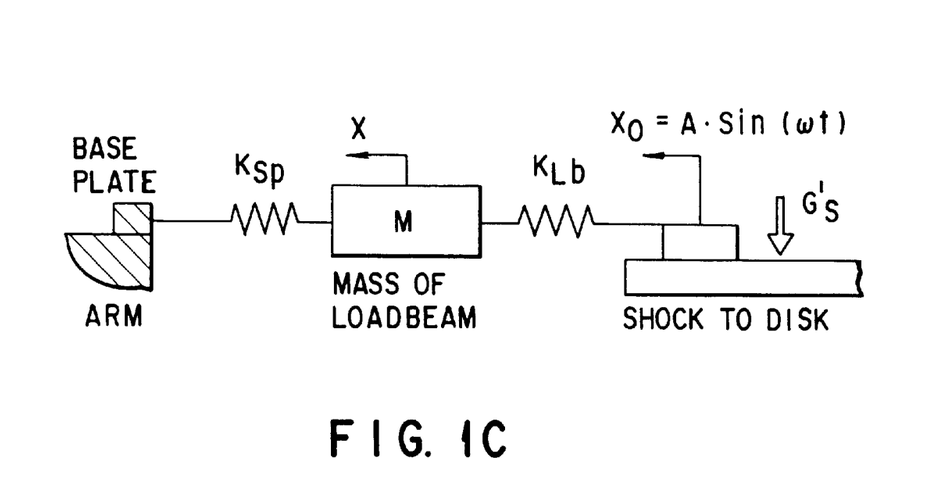

In order to prevent the aforesaid aforementioned dimple separation, it is advisable to diminish and retard the movement of the distal end portion of a load beam, that is, the region near a support projection, in the direction of a shock. FIGS. 1A, 1B and 1C show three supposable mechanical models for the analysis of the movement of the load beam. In the model shown in FIG. 1A, the shock is applied to an arm. In the model of FIG. 1B, the shock is applied to the center (i.e., center of gravity) of the mass of the load beam. In the model of FIG. 1C, the shock is applied to a disk.

The following is a description of the case where the shock is applied to the arm.

Figure 7:
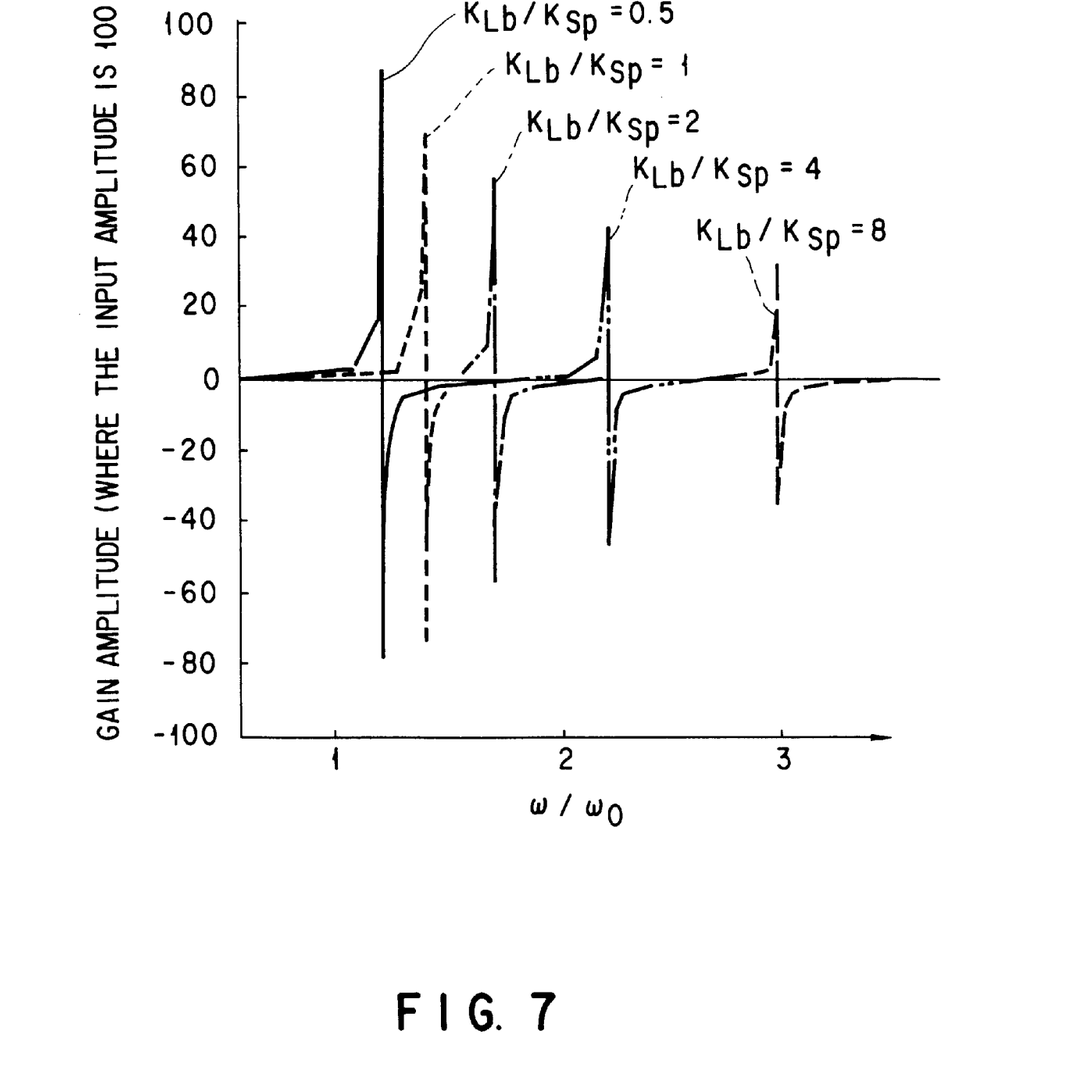
FIG. 7 is a diagram showing the relation between $\omega/\omega_0$ and amplitude obtained with $K_{Lb}/K_{SP}$ varied.

In FIG. 1A, M is supposed to represent the mass of the load beam; $K_{SP}$, spring constant for the region from the center of gravity of the load beam to a base plate; $K_{Lb}$, spring constant for the region from the center of gravity of the load beam to the support projection; $x_0$, displacement of the shocked arm; x, load beam displacement caused by the displacement of the arm; and a ω, angular velocity. Based on this supposition, FIG. 7 shows results of calculation of $$x = A \cdot \sin(\omega t) / \{K_{Lb}/K_{SP} - (\omega/\omega_0)^2 + 1\},$$

where $\omega_0^2 = K_{SP}/M$. FIG. 7 illustrates the following circumstances.

If $K_{Lb}/K_{SP}$ is made greater, the natural frequency of the load beam attributable to the displacement of the arm and its amplitude (gain) can be increased and reduced, respectively.

If the mass M of the load beam is reduced, $\omega_0$ increases, so that the natural frequency can be augmented.

As the amplitude (gain) gets nearer to 100, the aforementioned dimple separation can occur more easily. If the amplitude exceeds 60, in particular, the incidence of the dimple separation increases remarkably. It is advisable, therefore, to design the shape and the center of gravity of the load beam so that $K_{Lb}/K_{SP}$ is 2 or more. If $K_{Lb}/K_{SP}$ is 2 or more, as shown in FIG. 7, the amplitude can be restricted to 60 or below, and the natural frequency can be increased satisfactorily.

The following is a description of the case (FIG. 1B) where the shock is applied to the center of the mass of the load beam.

If $K_{Lb}$ is small and equal to $K_{SP}$, in this case, the region with $K_{Lb}$ from the center of gravity to the support projection and the region with $K_{SP}$ from the center of gravity to the base plate bend equally, so that the entire load beam inevitably warps like a bow, thus accelerating the occurrence of the dimple separation. If $K_{Lb}$ is larger enough than $K_{SP}$, on the other hand, the region with $K_{Lb}$ from the center of gravity to the support projection hardly bends, so that the dimple separation cannot easily occur. If the mass M of the load beam is small, a force that is caused to act on the suspension by the shock is small.

Accordingly, it is advisable to increase $K_{Lb}/K_{SP}$ and reduce M, in order to restrain the dimple separation in the case where the shock is applied to the load beam (mass) or the arm.

In the case where the shock is applied to the disk, on the other hand, the mechanical model is the one shown in FIG. 1C, which is conditioned quite contrarily to the one shown in FIG. 1A. Thus, $K_{Lb}/K_{SP}$ must be reduced in order to restrain the dimple separation. It is advisable to set M at a small value, as in the aforesaid case.

In the case where a shock acts on an HDD, the shock applied to the arm has a greater influence than the shock applied to the disk. This is because the possibility of a shock acting on a personal computer or the like is much higher during transportation or assembly operation with the HDD inactive than when the HDD is activated, that is, when the personal computer is operating.

When the HDD is inactive, in general, the position of the suspension is controlled so that the head is moved to the inner periphery side (retreat position) of the disk. For this reason, the shock test is executed, with the suspension located at the retreat position. The inner periphery side of the disk undergoes a smaller displacement (or smaller deflection) attributable to a shock than the outer periphery side. In other words, the shock applied to the arm is more influential than the shock applied to the disk when the HDD is inactive so that there is a high possibility of the application of a shock.

Thus, a highly shock-resistant suspension can be designed with priority to the mechanical model of FIG. 1A for the case where the shock is applied to the arm. More specifically, it should be intended only that $K_{Lb}/K_{SP}$ and M be increased and reduced, respectively.

In consideration of these circumstances, the suspension according to the present invention is characterized by comprising a load beam tapered from its proximal end toward its distal end and having bent edges formed individually on the opposite sides thereof, a base plate fixed to the proximal end of the load beam, a flexure provided on the distal end portion of the load beam, a support projection interposed between the load beam and the flexure, and a flexible portion defined in a region between the support projection and the base plate. In this suspension, openings are formed in an inner portion of a second region between the center of gravity of the flexible portion and the base plate, inside the bent edges, so that $K_{Lb}/K_{SP}$ is 2 or more, where $K_{Lb}$ is a spring constant for a first region between the center of gravity of the flexible portion and the support projection and $K_{SP}$ is a spring constant for the second region, the area of the openings accounting for 25% or more of the area of the inner portion.

Arranged in this manner, the suspension of the invention can enjoy an effective rigidity distribution for the prevention of dimple separation without changing its standard shape, e.g., existing Type 8, and the mass of its load beam can be reduced. This suspension is a shock-resistant suspension in which the amplitude of the shocked load beam can be restricted within its tolerance limit and the natural frequency of the load beam can be increased.

The load beam of the suspension of the invention is designed so that W2/W1 is 5 or less, where W1 and W2 are the width of the load beam in a position corresponding to the support projection and the width of the proximal end portion of the load beam, respectively. Although this suspension, having the openings therein, has a shape based on the Type 8, for example, $K_{Lb}/K_{SP}$ can be easily set at 2 or more (2.5 or more, in particular).

In consideration of the possibility of the disk being shocked as in the case of the mechanical model shown in FIG. 1C, $K_{Lb}/K_{SP}$ cannot be increased unduly. According to the present invention, it is advisable to restrict the upper limit of $K_{Lb}/K_{SP}$ to 5.

The openings are not limited in form. For example, a plurality of relatively large openings may be formed in positions symmetrical with respect to the center line of the load beam. Alternatively, a large number of pores of the same shape (hexagonal, circular, square, etc.) and size may be arranged at regular pitches.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Figure 2:
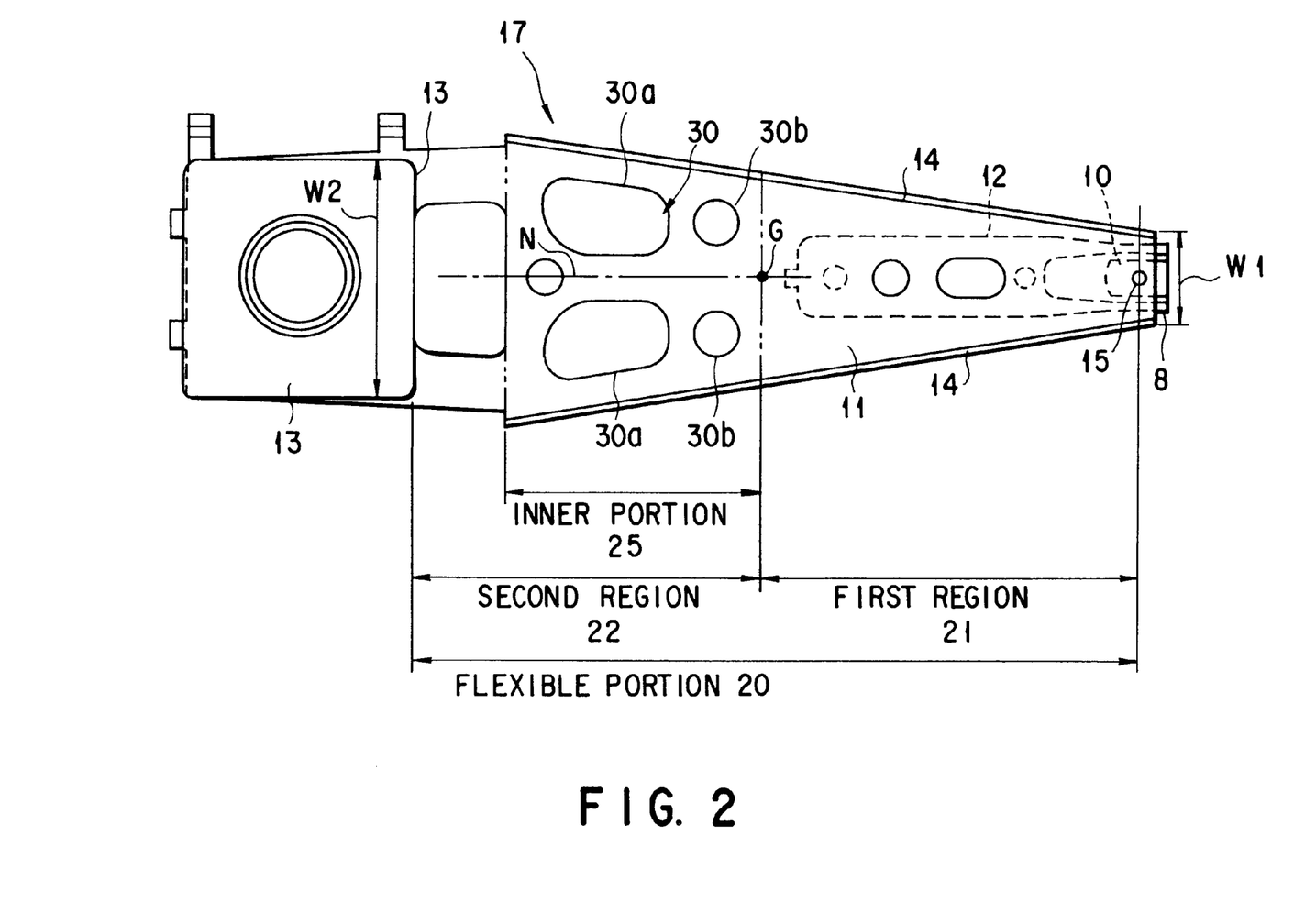
FIG. 2 is a plan view of a suspension according to a first embodiment of the present invention.

A first embodiment of the present invention will now be described with reference to FIG. 2 showing a suspension 17. In the description of this embodiment to follow, common reference numerals are used to designate common portions that are also included in the suspension 7 shown in FIGS. 8 to 10, and a detailed description of those portions is omitted.

The suspension 17 shown in FIG. 2, like the conventional one, includes a load beam 11 formed of a thin precision plate spring, a flexure 12 formed of a very thin plate spring fixed to the distal end portion of the beam 11 by laser welding or the like, a base plate 13 fixed to the proximal end portion of the beam 11 by laser welding or the like, etc. The flexure 12 is provided with a slider 10.

The load beam 11 has a shape similar to an isosceles triangle, tapered from its proximal end portion toward its distal end portion. A bent edge 14 is formed on each of two opposite oblique side portions of the beam 11.

A support projection 15 protrudes from the distal end portion of the load beam 11 toward the flexure 12 in the thickness direction of the beam 11. The projection 15 is substantially hemispherical. The distal end of the projection 15 abuts against the flexure 12.

The suspension 17 is used in the hard disk drive (HDD) 1, the construction of which has previously been described with reference to FIG. 8. The load beam 11 is fixed to one of the arms 6 of the HDD 1 by means of the base plate 13. Thus, that region of the suspension 17 which extends from an end 13a of the base plate 13 to the support projection 15 functions as a flexible portion 20 that can bend substantially in the thickness direction.

In this specification, the region that ranges from the center of gravity G of the flexible portion to the support projection 15 is referred to as a first region 21, and the region from the center of gravity G to the base plate 13 as a second region 22. The spring constants of the first and second regions 21 and 22 are given by $K_{Lb}$ and $K_{SP}$ respectively.

Openings 30 are formed in an inner portion 25 of the second region 22 inside the bent edges 14 so that $K_{Lb}/K_{SP}$ is 2 or more. The total area of the openings 30 accounts for 25% or more of an area S1 of the portion 25. The openings 30 are not particularly restricted in form. In the first embodiment shown in FIG. 2, for example, a plurality of relatively large openings 30a and 30b are formed in positions symmetrical with respect to a center line N of the load beam 11. In the case of EXAMPLE 1 based on this embodiment, the ratio of an area S2 of the openings 30 to the area S1 of the inner portion 25 (S2/S1) is 0.342, while $K_{Lb}/K_{SP}$ is 2.68. The load beam 11 is shaped so that W2/W1 is 3, where W1 and W2 are the width of the beam 11 in a position corresponding to the support projection 15 and the width of the proximal end portion of the beam 11, that is, the width of the base plate 13, respectively. Although the suspension 17 has an external shape based on the conventional type (Type 8) shown in FIG. 9, $K_{Lb}/K_{SP}$ can be set at 2.5 or more.

Figure 3:
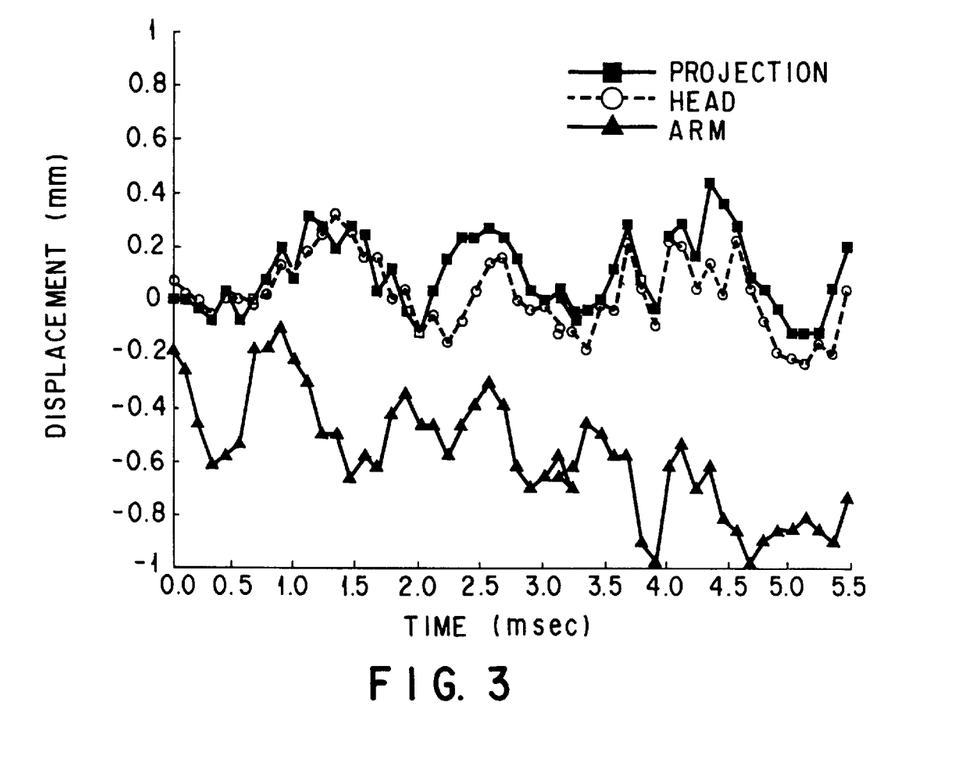
FIG. 3 is a diagram showing displacements of a head and the like in a shock test on the suspension of FIG. 2.
Figure 4:
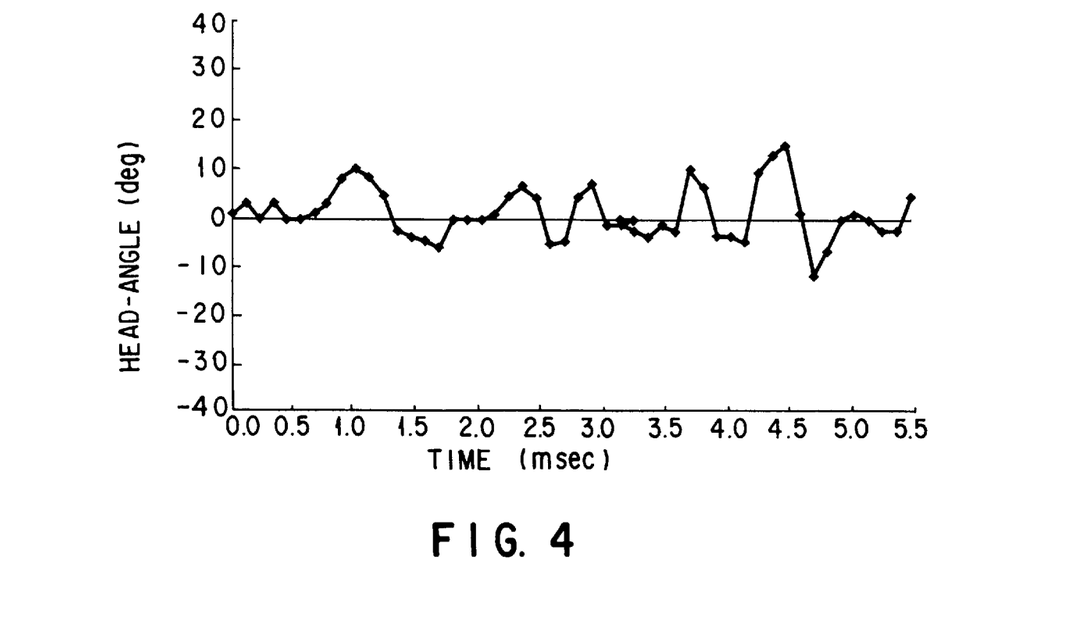
FIG. 4 is a diagram showing change of the head angle in the shock test on the suspension of FIG. 2.

FIGS. 3 and 4 show results of a shock test on the suspension 17 of EXAMPLE 1. Test conditions include a duration time of 0.96 msec, acceleration (G's) of 452 G, and contact pressure (G/L) of 3.5 gf between the projection 15 and the flexure 12. As shown in FIG. 3, the respective displacements and moving speeds of the head 8 and the projection 15 are lower than in the case of the prior art example shown in FIG. 13 throughout the axis of abscissa (even at points near 1.0 msec), and there is hardly any time lag between the displacements of the members 8 and 15. As shown in FIG. 4, moreover, the change of the head angle is smaller than in the case of the prior art example shown in FIG. 14. Therefore, no dimple separation occurred.

Figure 5:
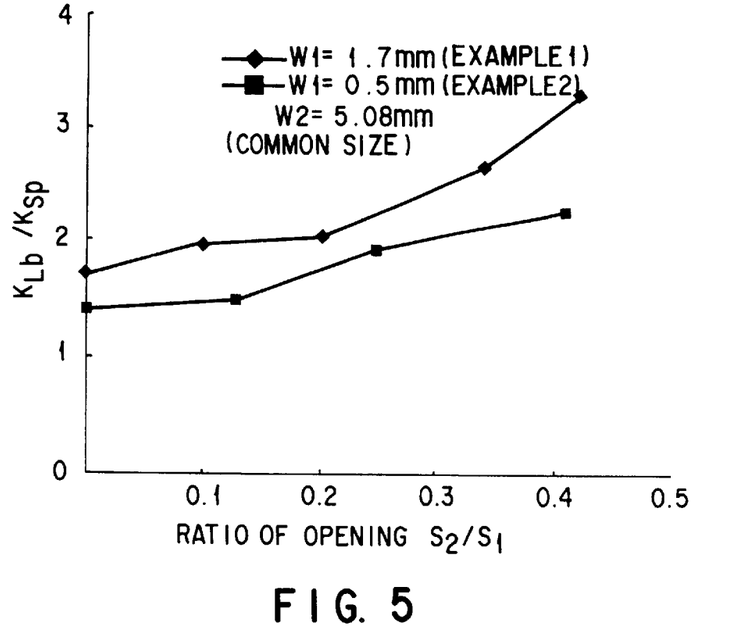
FIG. 5 is a diagram showing the relation between an opening area ratio S2/S1 and $K_{Lb}/K_{SP}$.

FIG. 5 shows the relation between the aforementioned opening area ratio S2/S1 and $K_{Lb}/K_{SP}$ with respect to two load beam sizes (EXAMPLE 1 with W1=1.7 mm and W2=5.08 and EXAMPLE 2 with W1=0.5 mm and W2=5.08). As seen from FIG. 5, $K_{Lb}/K_{SP}$ can be set at 2 or more by adjusting the area ratio S2/S1 to 0.25 or more and the percentage of the area of the openings 30 in the inner portion 25 to 25% or more.

Figure 6:
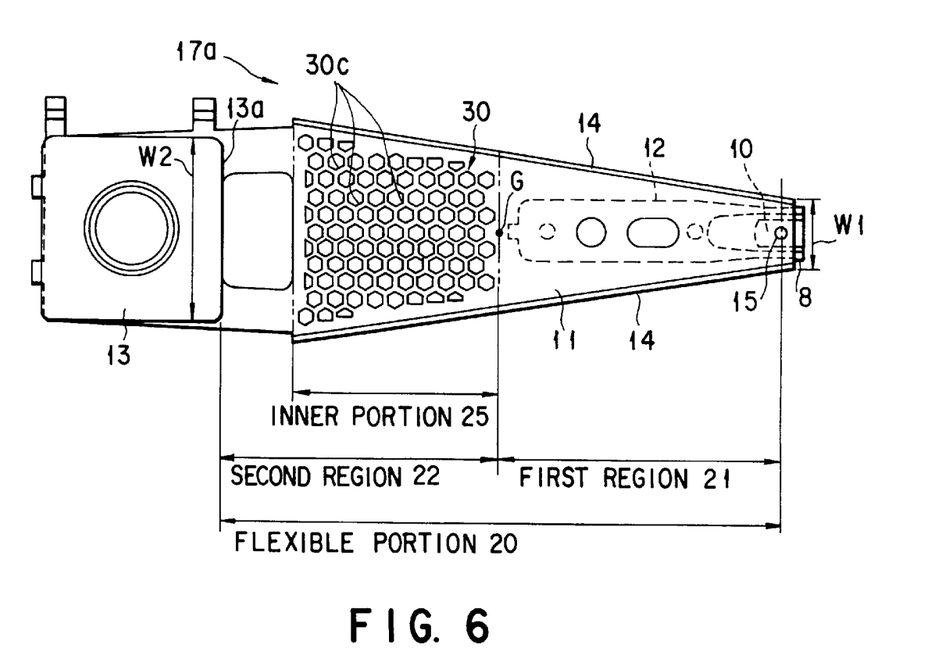
FIG. 6 is a plan view of a suspension according to a second embodiment of the invention.

FIG. 6 shows a suspension 17a according to a second embodiment of the present invention. In this suspension 17a, a large number of hexagonal pores 30c of the same size, for use as openings 30, are arranged at regular pitches in an inner portion 25 inside bent edges 14. For the construction of other elements and other functions or effects, the second embodiment is arranged in the same manner as the first embodiment. In EXAMPLE 3 based on this second embodiment, the area ratio S2/S1 for the openings 30 of the suspension 17a is 0.418, while $K_{Lb}/K_{SP}$ is 3.31. W2/W1 is 3. Although the suspension 17a also has an external shape based on the conventional type (Type 8), $K_{Lb}/K_{SP}$ can be set at 2.5 or more.

TABLE 1 below shows results of comparison between various elements of the suspensions 17 and 17a of EXAMPLES 1 and 3 and those of the conventional suspension (Type 8). In any of these cases, the load beam 11 is 64 μm thick.

TABLE 1

|  | W2/W1 | S2/S1 | M [g] | $K_{Lb}$ [gf/mm] | $K_{Sp}$ [gf/mm] | $K_{Lb}/K_{Sp}$ |
|---|---|---|---|---|---|---|
| Conventional suspension (Type 8) | 11.0 | 0.129 | $2.86 \times 10^{-5}$ | 120 | 81 | 1.49 |
| EXAMPLE 1 | 3.0 | 0.342 | $2.94 \times 10^{-5}$ | 181 | 67 | 2.68 |
| EXAMPLE 3 | 3.0 | 0.418 | $2.83 \times 10^{-5}$ | 185 | 56 | 3.31 |

It is to be understood that the present invention is not limited to the embodiments described above, and that the components of the invention, including the respective shapes of the load beam, flexure, head, support projection, openings, etc., may be suitably changed without departing from the scope or spirit of the invention. Further, the present invention may be also applied to a suspension in which the support projection is formed on the flexure.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

We claim:

1. A suspension for disk drive, comprising:
    a load beam having a proximal end portion fitted with a base plate, a distal end portion fitted with a flexure, and bent edges formed individually on the opposite sides thereof, the load beam being gradually tapered from the proximal end portion toward the distal end portion;

a support projection interposed between the load beam and the flexure;

a flexible portion of the load beam defined in a region between the support projection and the base plate; and openings formed in an inner portion of a second region between the center of gravity of the flexible portion and the base plate, inside the bent edges, so that $K_{Lb}/K_{SP}$ is 2 or more, where $K_{Lb}$ is a spring constant for a first region between the center of gravity of the flexible portion and the support projection and $K_{SP}$ is a spring constant for the second region, the area of the openings accounting for 25% or more of the area of the inner portion.

2. A suspension for disk drive according to claim 1, wherein said load beam is designed so that W2/W1 is 5 or less, where W1 and W2 are the width of the load beam in a position corresponding to the support projection and the width of the proximal end portion of the load beam, respectively.

3. A suspension for disk drive according to claim 1, wherein said load beam is designed so that $K_{Lb}/K_{SP}$ ranges from 2 to 5.

4. A suspension for disk drive according to claim 1, wherein said openings are composed of a large number of pores of the same size arranged at regular pitches in the inner portion inside bent edges.

* * * * *